United States Patent
Wang et al.

(10) Patent No.: US 10,052,855 B2
(45) Date of Patent: Aug. 21, 2018

(54) LAMINATING DEVICE FOR COMPOSITE MATERIALS

(71) Applicant: Industrial Technology Research Institute, Hsin-Chu (TW)

(72) Inventors: Teng-Yen Wang, Yunlin County (TW);
Lung-Wu Chang, Tainan (TW);
Chang-Chou Li, Tainan (TW);
Yang-Cheng Lin, Chiayi (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 337 days.

(21) Appl. No.: 14/981,207

(22) Filed: Dec. 28, 2015

(65) Prior Publication Data
US 2017/0151766 A1    Jun. 1, 2017

(30) Foreign Application Priority Data
Dec. 1, 2015   (TW) .............................. 104140181 A

(51) Int. Cl.
*B32B 37/00* (2006.01)
*B32B 37/06* (2006.01)
(Continued)

(52) U.S. Cl.
CPC .......... *B32B 37/0053* (2013.01); *B32B 37/06* (2013.01); *B29C 65/1632* (2013.01);
(Continued)

(58) Field of Classification Search
CPC .. B32B 37/0053; B32B 37/06; B29C 65/1629
See application file for complete search history.

(56) References Cited

U.S. PATENT DOCUMENTS 4,090,911 A     5/1978   Shaffer
5,571,368 A  * 11/1996   Barge ....................... B32B 37/06
                                                    100/304
(Continued)

FOREIGN PATENT DOCUMENTS

CN      2227540 Y    5/1996
CN      2575135 Y    9/2003
(Continued)

OTHER PUBLICATIONS

C.M. Stokes-Griffin and P. Compston, "A combined optical-thermal model for near infrared laser heating of thermoplastic composites in an automated tape placement process", Aug. 14, 2014, pp. 104-115, Research School of Engineering, CECS, Australian National University, Canberra ACT 0200, Australia, Elsevier Ltd.

(Continued)

*Primary Examiner* — Daniel McNally
(74) *Attorney, Agent, or Firm* — WPAT, PC

(57) ABSTRACT

A laminating device for composite material includes a laser device, a hot roller assembly which has a first hot roller and a second hot roller, a cool roller assembly which has a first cool roller and a second cool roller, an axial roller-driving unit and a spring force-adjusting unit. The laser device provides a laser beam onto laminating surfaces of two separate composite materials prior to the hot roller assembly. The axial roller-driving unit drives the first hot roller and the second hot roller, and the first cool roller and the second cool roller, to undergo relative movement in a first direction. The spring force-adjusting unit provides spring forcing to the first hot roller and the second hot roller, and the first cool roller and the second cool roller, to ensure further the lamination of the two composite materials.

11 Claims, 4 Drawing Sheets

(51) Int. Cl.
  *B32B 37/08* (2006.01)
  *B32B 37/04* (2006.01)
  *B29C 65/16* (2006.01)
  *B29C 65/18* (2006.01)
  *B29C 65/72* (2006.01)
  *B29C 65/00* (2006.01)

(52) U.S. Cl.
  CPC .......... *B29C 65/1658* (2013.01); *B29C 65/18* (2013.01); *B29C 65/72* (2013.01); *B29C 66/0342* (2013.01); *B29C 66/1122* (2013.01); *B29C 66/45* (2013.01); *B29C 66/8161* (2013.01); *B29C 66/83413* (2013.01); *B32B 37/0007* (2013.01); *B32B 37/04* (2013.01); *B32B 37/08* (2013.01); *B32B 2307/552* (2013.01); *B32B 2307/734* (2013.01); *B32B 2310/0843* (2013.01)

(56) References Cited

U.S. PATENT DOCUMENTS

| | | | |
|---|---|---|---|
| 6,357,504 | B1 | 3/2002 | Patel et al. |
| 6,913,055 | B2 | 7/2005 | Sugaya et al. |
| 7,888,250 | B2 | 2/2011 | Kawaguchi |
| 8,097,107 | B2 * | 1/2012 | Morgan ............ B32B 17/10862 156/106 |
| 2009/0139634 | A1 | | 6/2009 Morgan et al. |

FOREIGN PATENT DOCUMENTS

| | | | |
|---|---|---|---|
| CN | 103381692 | A | 11/2013 |
| CN | 103538341 | | 1/2014 |
| JP | 04249134 | A * | 4/1992 |
| JP | 4-249134 | A | 9/1992 |
| JP | 2011-126011 | A | 6/2011 |
| JP | 2013-71282 | A | 4/2013 |
| TW | 499334 | | 8/2002 |
| TW | 200417475 | A | 9/2004 |
| TW | I250936 | | 3/2006 |
| TW | 200643803 | A | 12/2006 |
| TW | 201012562 | A | 4/2010 |
| TW | I492807 | | 7/2015 |

OTHER PUBLICATIONS

W.J.B. Grouve, L.L. Warnet, B. Rietman, H.A. Visser, R. Akkerman, "Optimization of the tape placement process parameters for carbon—PPS composites", Mar. 14, 2013, pp. 44-53, University of Twente, Faculty of Engineering Technology, Production Technology Group, Drienerlolaan 5, 7500AE Enschede, The Netherlands, Elsevier Ltd.

Boming Zhang and Lin Zhao, "Progressive damage and failure analysis of fiber-reinforced laminated composites containing a hole", Aug. 16, 2011, pp. 2243-2252, Advanced Materials Research vols. 314-316, Trans Tech Publications, Switzerland.

Taiwan Intellectual Property Office, "Office Action", dated Jun. 12, 2017.

State Intellectual Property Office of the People's Republic of China, "Office Action", dated May 3, 2018.

* cited by examiner

LAMINATING DEVICE FOR COMPOSITE MATERIALS

CROSS REFERENCE TO RELATED APPLICATION

The present application is based on, and claims priority from, Taiwan (International) Application Serial Number 104140181, filed on Dec. 1, 2015, the disclosure of which is hereby incorporated by reference herein in its entirety.

TECHNICAL FIELD

The present disclosure relates to a laminating device, and more particularly to the laminating device for composite materials.

BACKGROUND

Nowadays, composite materials have been widely implemented in various fields. Beside the well-known superior mechanical properties such as high stiffness, high strength and light weights, the composite materials are further featured in excellent fatigue strength and environmental stability. Hence, in automobile, aerospace and military industries, more and more engineers use the composite materials to replace the metallic materials.

Generally, a typical composite material is an excellent material consisted of two or more than two basic materials, among which no chemical reaction is involved. Basically, the composite material includes a matrix and a reinforced material. The matrix provides a continuous material such as a metal, a ceramics, a polymer or the like to fix solidly the reinforced material and to ensure the transmission of loads upon the reinforced material. The reinforced material mainly includes fibers, thin chips and/or particles, in which the fiber-type reinforced material is most common seen, and the continuous fiber is the best fiber to provide excellent mechanical properties and plenty flexibility in design. Currently, the fiber is mainly a carbon fiber or a glass fiber. The laminating of two composite materials shall need a heating process upon the composite materials so as to melt the adhesive before a firmly lamination can be done. If the heating is not complete or unevenly, then inner stress would exist in the laminated composite materials. Also, voids in the adhesive surface are inevitable. Both of the inner stress and the voids would weaken the strength and reduce the stiffness of the composite materials.

Therefore, the topic of developing a laminating device for overcoming the aforesaid defects in the composite materials is definitely necessary and welcome to the art. Namely, it is kind of urgency to develop a laminating device for composite materials that is featured in improving compactness of the composite materials, eliminating the voids while in laminating the composite materials, and increasing the strength and the stiffness of the composite materials.

SUMMARY

In one embodiment in accordance with this disclosure, a laminating device for composite materials, applicable to laminate two separate composite materials, comprises:

a laser unit for providing a laser beam;

a hot roller assembly, including a first hot roller and a second hot roller, for providing the two separate composite materials a thermo-compression bonding, wherein, before the two separate composite materials enter a spacing between the first hot roller and the second hot roller, the laser beam irradiates laminating surfaces of the two separate composite materials;

a cool roller assembly, including a first cool roller and a second cool roller, for providing the composite materials after the thermo-compression bonding to experience a cold-compression bonding between the first cool roller and the second cool roller;

an axial roller-driving unit, for driving the first hot roller and the second hot roller to undergo a relative axial motion in a first direction and also for driving the first cool roller and the second cool roller to undergo another relative axial motion in the first direction; and a spring force-adjusting unit, for providing elastic contact of the two composite materials between the first hot roller and the second hot roller, and also for providing elastic contact of the composite material between the first cool roller and the second cool roller.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
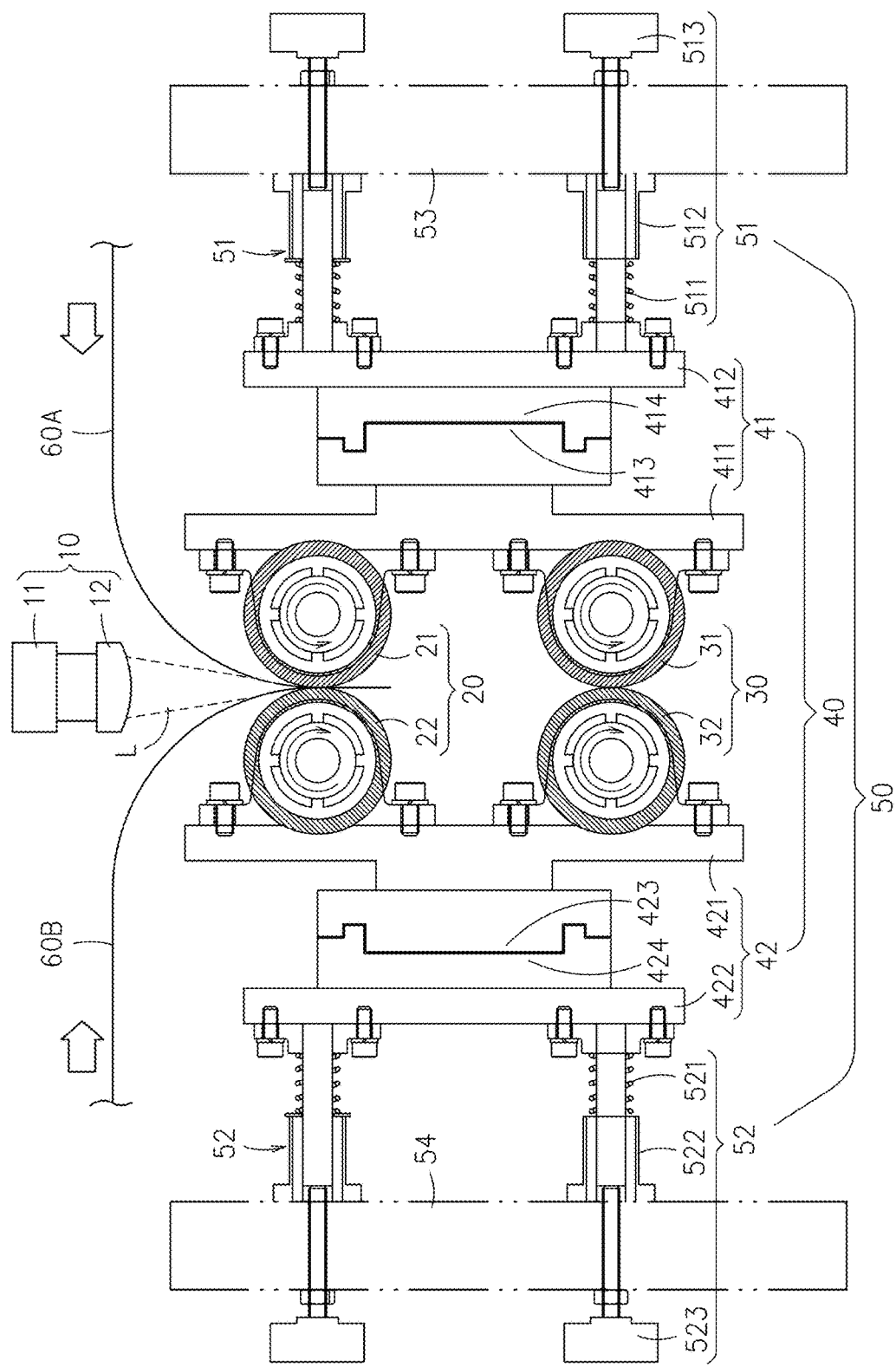
FIG. 1 is a schematic front view of an embodiment of the laminating device for composite materials in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
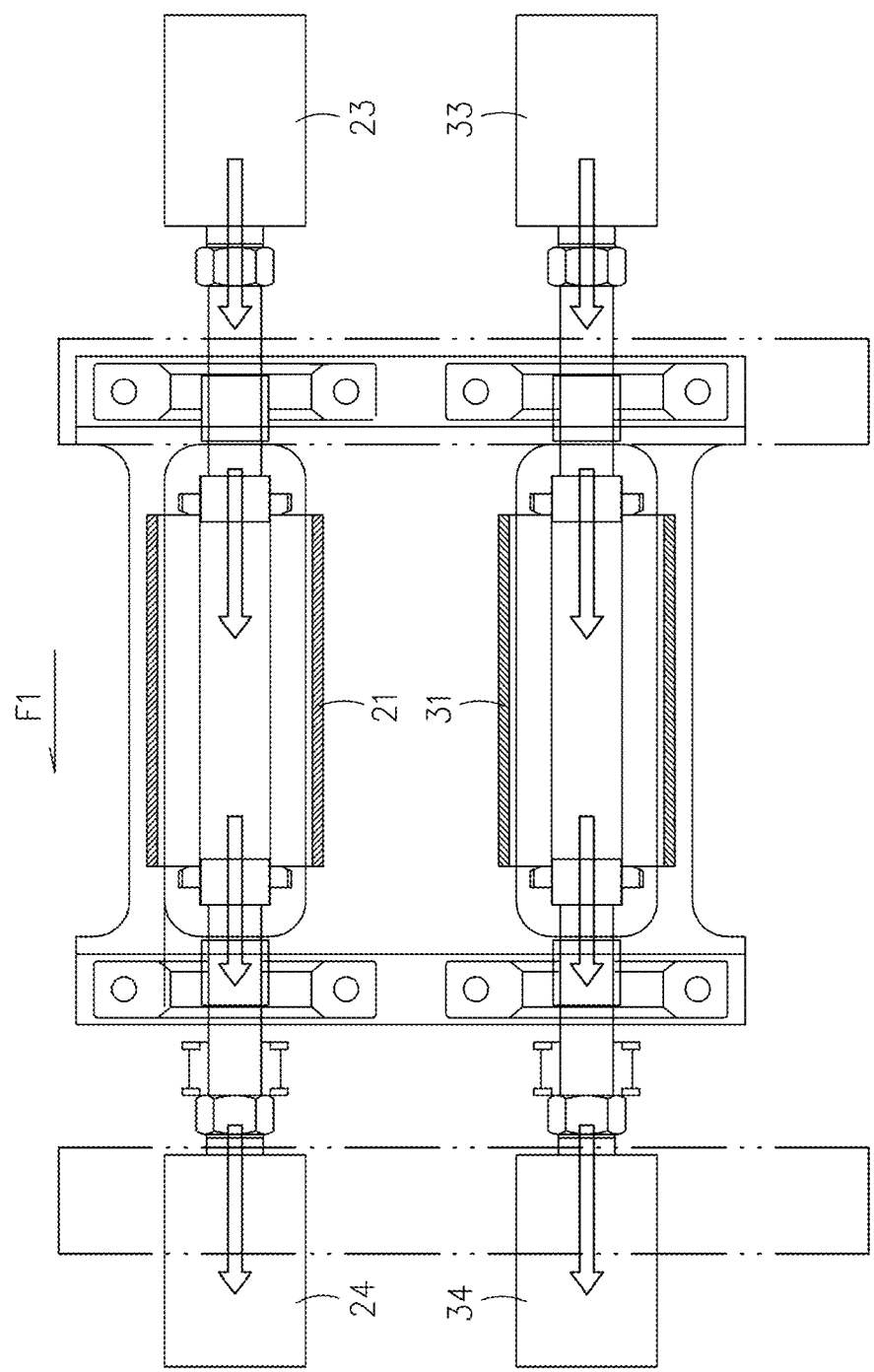
FIG. 2 is a lateral view of FIG. 1.
Figure 3:
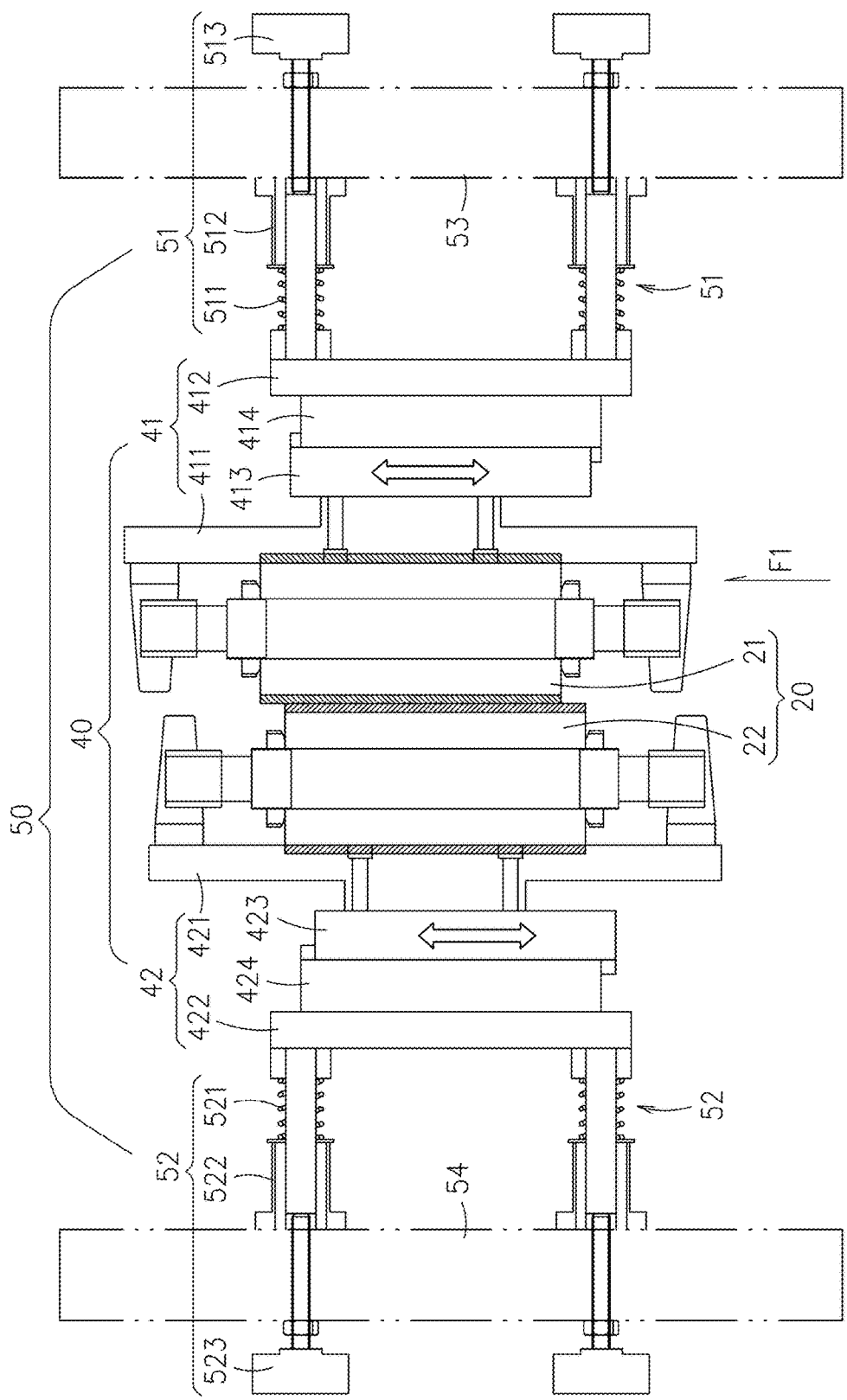
FIG. 3 is a top view of FIG. 1.

Referring now to FIG. 1 to FIG. 3, the laminating device for composite materials in accordance with the present disclosure, applicable to laminate two separate composite materials, includes a laser unit 10, a hot roller assembly 20, a cool roller assembly 30, an axial roller-driving unit 40 and a spring force-adjusting unit 50.

The laser unit 10 further includes a laser source 11 and an optical lens 12. In this disclosure, the laser source 11 for providing a laser beam L can be one of the carbon dioxide laser, the diode laser, the fiber laser and the like. The optical lens 12 for allowing the laser beam L to pass therethrough is to deflect the laser beam L to irradiate in a predetermined.

In this disclosure, the optical lens 12 is to adjust the passing laser beam L to become an off-focused laser beam. In addition, the laser source of this disclosure is to provide a laser beam L with a wavelength of 300-1500 nm.

The hot roller assembly 20 includes a first hot roller 21 and a second hot roller 22. The hot roller assembly 20 of this disclosure can adopt a heating means selected from the group of an electric heating means, a hot-fluid heating means and the like, in which the fluid can be one of an oil, the wind, the water and the like. The heating means is to heat up the first hot roller 21 and the second hot roller 22 to a first temperature. As shown in FIG. 2, a shaft of the first hot roller 21 is extended bi-directionally to connect a hot fluid-inlet unit 23 and an opposite hot fluid-outlet unit 24 with respect to the first hot roller 21. When a hot fluid is introduced to heat the first hot roller 21 and/or the second hot roller 22 (definitely, the shaft is a hollow shaft for flowing the fluid thereinside), the hot fluid would enter the shaft of the first hot roller 21 and/or another hollow shaft of the second hot roller 22 from the corresponding hot fluid-inlet units 23. Thereupon, the first hot roller 21 and/or the second hot roller 22 sleeving outside the corresponding shafts can be heated by the hot fluid to the first temperature. The hot fluid leaves the respective shafts of the first hot roller 21 and/or the second hot roller 22 via the corresponding hot fluid-outlet units 24. Upon such an arrangement, a thermo-compression bonding can be carried out to laminate the two separate composite materials 60A, 60B entering a rolling space between the first hot roller 21 and the second hot roller 22. In this disclosure, materials for forming the composite materials 60A, 60B are not limited particularly. Materials can be relevant materials such as thermoplastic or thermosetting carbon-fiber composite materials. Before the two separate composite materials 60A, 60B enter the spacing between the first hot roller 21 and the second hot roller 22, the laser beam L deflected by the optical lens 12 can irradiate corresponding laminating surfaces of the two separate composite materials 60A, 60B.

The cool roller assembly 30 including a first cool roller 31 and a second cool roller 32, cool roller assembly 30 adopts one of a fluid-cooling means, an air-cooling means and the like for cooling down the first cool roller 31 and the second cool roller 32 to a second temperature. As shown in FIG. 2, a shaft of the first cool roller 1 is extended bi-directionally to connect a cool fluid-inlet unit 33 and an opposite cool fluid-outlet unit 34 with respect to the first cool roller 31. When a cool fluid is introduced to cool down the first cool roller 31 and/or the second cool roller 32 (definitely, the shaft is a hollow shaft for flowing the fluid thereinside), the cool fluid would enter the shaft of the first cool roller 31 and/or another hollow shaft of the second cool roller 32 from the corresponding cool fluid-inlet units 33. Thereupon, the first cool roller 31 and/or the second cool roller 32 sleeving outside the corresponding shafts can be cooled down by the cool fluid to the second temperature. The cool fluid leaves the respective shafts of the first cool roller 31 and/or the second cool roller 32 via the corresponding cool fluid-outlet units 34. In this disclosure, the second temperature is lower than the first temperature, and the determination of the first and the second temperatures is dependent to the materials used for the composite materials. After experiencing the thermo-compression bonding at the hot roller assembly 20, the composite materials 60A, 60B are then sent into the spacing between the first cool roller 31 and the second cool roller 32 for undergoing a cold-compression bonding.

Axial directions of the aforesaid first hot roller 21, second hot roller 22, first cool roller 31 and second cool roller 32 are all parallel to a first direction F1. The first hot roller 21 and the second hot roller 22 are driven to perform relative rotations. Similarly, the first cool roller 31 and the second cool roller 32 are also driven to perform relative rotations. Materials for the first hot roller 21, the second hot roller 22, the first cool roller 31 and the second cool roller 32 are not specifically defined in this disclosure. For example, the silicon rubber with an endurance temperature up to 300° C. can be relevant.

The axial roller-driving unit 40 is to drive the spacing between the first hot roller 21 and the second hot roller 22 and the spacing between the first cool rollers 31 and second cool roller 32 to move relatively in the first direction F1. The axial roller-driving unit 40 includes symmetrically a first driving assembly 41 and a second driving assembly 42. The first driving assembly 41 further includes a first plate structure 411 and a second plate structure 412. The first plate structure 411 is to load the first hot roller 21 and the first cool rollers 31. The second plate structure 412 is connected to the spring force-adjusting unit 50. Further, between the first plate structure 411 and the second plate structure 412, a sliding rack structure consisted of a protrusive block 413 and a groove structure 414 is included to allow both the first plate structure 411 and the second plate structure 412 able to slide with respect to each other in the first direction F1. The second driving assembly 42 includes a third plate structure 421 and a fourth plate structure 422, in which the third plate structure 421 is to load the second hot roller 22 and the second cool roller 32, and the fourth plate structure 422 is connected to the spring force-adjusting unit 50. Also, between the third plate structure 421 and the fourth plate structure 422, another sliding rack structure consisted of the protrusive block 423 and the groove structure 424 is included to allow relative sliding between the third plate structure 421 and the fourth plate structure 422 in the first direction F1.

Accordingly, the first hot roller 21 and the second hot roller 22 can perform a relative axial reciprocal motion, while the second hot roller 22 and the second cool roller 32 can also perform another relative axial reciprocal motion. It shall be noted that, since the first hot roller 21 and the first cool rollers 31 are both fixed at the first plate structure 411 and thus when the first plate structure 411 slides in the first direction F1 with respect to the second plate structure 412, the first hot roller 21 and the first cool roller 31 would move synchronously (namely, to undergo the same displacement) so as to avoid possible offset between the first hot roller 21 and the first cool roller 31 in the compression process, in which the offset in between would allow wrinkles to occur at the laminated composite materials 60A, 60B. Similarly, since the second hot roller 22 and the second cool rollers 32 are both fixed at the third plate structure 421 and thus when the third plate structure 421 slides in the first direction F1 with respect to the fourth plate structure 422, the second hot roller 22 and the second cool roller 32 would move synchronously (namely, to undergo the same displacement) so as to avoid possible offset between the second hot roller 22 and the second cool roller 32 in the compression process, in which the offset in between would allow wrinkles to occur at the laminated composite materials 60A, 60B.

The spring force-adjusting unit 50 includes a plurality of first spring assemblies 51 and a plurality of second spring assemblies 52, existing in pairs and in a symmetric manner.

The first spring assembly 51 is mounted at a first supportive plate 53 and is connected with the second plate structure 412. Each of the first spring assemblies 51 includes a first spring member 511, a first constraint member 512 and a first adjusting node 513. The first spring member 511 is to provide a first spring force to the second plate structure 412. The first constraint member 512 is located between the first supportive plate 53 and the first spring member 511. The first adjusting node 513 located at the first supportive plate 53 is to adjust a distance between the first constraint member 512 and the second plate structure 412, so as thereby to vary the spring force that the first spring member 511 exerts on the second plate structure 412.

The second spring assembly 52 is mounted at a second supportive plate 54 and is connected with the fourth plate structure 422. Each of the second spring assemblies 52 includes a second spring member 521, a second constraint member 522 and a second adjusting node 523. The second spring member 521 is to provide a second spring force to the fourth plate structure 422. The second constraint member 522 is located between the second supportive plate 54 and the second spring member 521. The second adjusting node 523 located at the second supportive plate 54 is to adjust a distance between the second constraint member 522 and the fourth plate structure 422, so as thereby to vary the spring force that the second spring member 521 exerts on the fourth plate structure 422.

By providing the first spring assemblies 51 to simultaneously provide the first spring forces to the second plate structure 412, the first plate structure 411, the first hot roller 21 and the first cool rollers 31, and by providing the second spring assemblies 52 to simultaneously provide the second forces to the fourth plate structure 422, the third plate structure 421, the second hot roller 22 and the second cool roller 32. Thus, the spacing between the first hot roller 21 and the second hot roller 22 and the spacing between the first cool roller 31 and the second cool roller 32 can provide elastic contact with the two composite materials 60A, 60B.

Referring to FIG. 1, the process for laminating the two composite materials in accordance with the present invention is firstly to send the two separate composite materials 60A, 60B into the spacing between the first hot roller 21 and the second hot roller 22 for performing a thermo-compression bonding. Before the composite materials 60A, 60B enter the spacing between the first hot roller 21 and the second hot roller 22, the laser beam L is introduced to irradiate the surfaces of the composite materials 60A, 60B to be laminated. Since the effective heat area of the laser beam L is limited, thus the resin materials coated over surfaces of the composite materials 60A, 60B can be heated up and then melted precisely so as to enhance the lamination between the composite materials 60A, 60B. By adopting an optical lens 12 to control the irradiation area and the irradiation angle, namely the heating area and the heating angle, then the lamination in between can be further assured.

In the thermo-compression bonding, except that the first hot roller 21 and the second hot roller 22 exert thermal compression to the two composite materials 60A, 60B for lamination, the first hot roller 21 and the second hot roller 22 can undergo a relative axial reciprocal motion (as the state shown in FIG. 3) so as to eliminate possible voids generated during the laminating of the two composite materials 60A, 60B. The void is eliminated by the relative reciprocal motions between the first hot roller 21 and the second hot roller 22. In this disclosure, the frequency and distance of the axial motion of the first hot roller 21 and the second hot roller 22 can be varied according to the composite materials for lamination. For example, the frequency of the axial motion can be 10~20 Hz, and the distance thereof can be 1~3 mm.

Then, in the cold-compression bonding, the first cool roller 31 and the second cool roller 32 are applied to cool down the composite materials 60A, 60B after the thermo-compression bonding so as to reduce the overall temperature. Thereupon, the resin material between the two composite materials 60A, 60B can be rapidly solidified to firmly bind the two composite materials 60A, 60B together with enhanced laminating efficiency and tensile strength.

In addition, since the spring force-adjusting unit 50 is included, thus firm lamination between the two composite materials 60A, 60B can be always maintained during both the thermo-compression bonding and the cold-compression bonding.

Figures 4, 5:
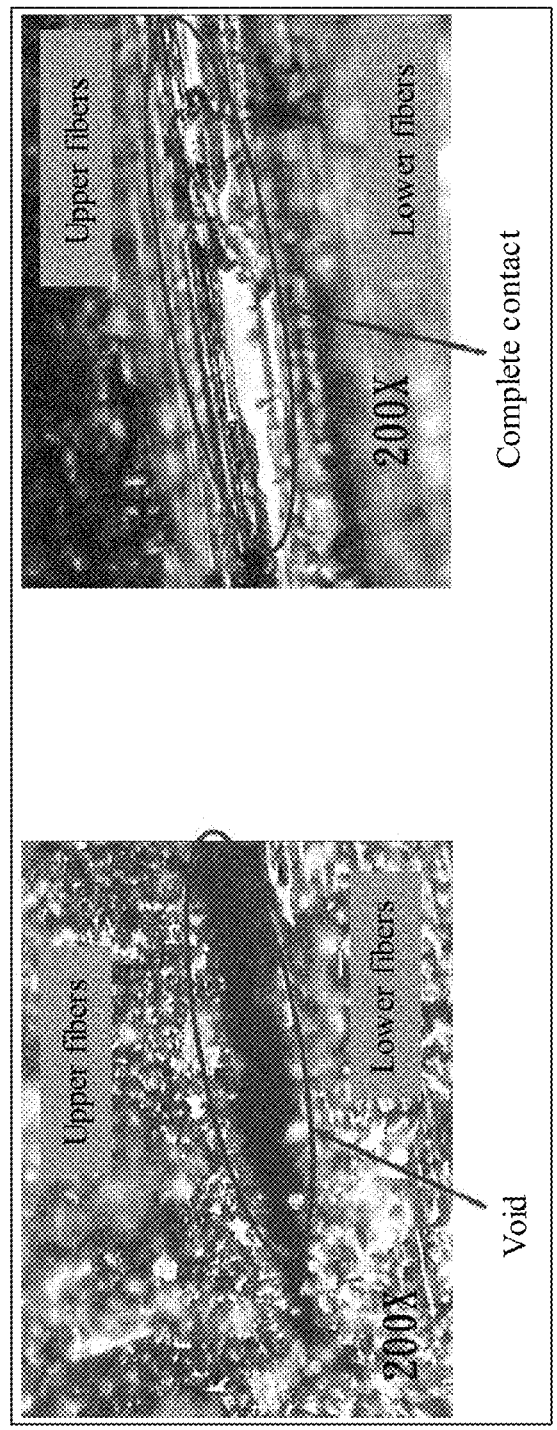
FIG. 4 is a microscopic view of a conventional laminating surface of the composite materials.
FIG. 5 is a microscopic view of a laminating surface of the composite materials in accordance with this disclosure.

Referring to FIG. 4, while in applying a conventional laminating device to laminate the composite materials, the interface therebetween is shown to be incomplete lamination due to the existence of the void. On the other hand, as shown in FIG. 5, while in applying the laminating device for composite materials of this disclosure to laminate the composite materials, the interface therebetween is shown to be much improved without the voids.

In summary, by providing the laminating device for composite materials in this disclosure, since the laser unit is directly introduced to heat up the surfaces for lamination, since the axial roller-driving unit is used to perform relative axial motions between the hot rollers and the cool rollers, and since the spring force-adjusting unit is used to adjust elastically the compression for lamination at the hot rollers and the cool rollers, then the compactness of the composite materials can be enhanced, the voids generated during laminating the composite materials can be eliminated, and thus the strength and stiffness of composite materials can be substantially increased.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A laminating device for composite materials, applicable to laminate two separate composite materials, comprising:
   a laser unit for providing a laser beam;
   a hot roller assembly, including a first hot roller and a second hot roller, for thermo-compression boding of the two separate composite materials, wherein, before the two separate composite materials enter a spacing between the first hot roller and the second hot roller, the laser beam irradiates laminating surfaces of the two separate composite materials;
   a cool roller assembly, including a first cool roller and a second cool roller, for cold-compression bonding between the first cool roller and the second cool roller of the composite materials after the thermo-compression bonding;
   an axial roller-driving unit, for driving the first hot roller and the second hot roller to undergo a relative axial motion in a first direction and also for driving the first cool roller and the second cool roller to undergo another relative axial motion in the first direction; and
   a spring force-adjusting unit, for providing elastic contact of the two composite materials between the first hot roller and the second hot roller, and also for providing elastic contact of the composite material between the first cool roller and the second cool roller.

2. The laminating device for composite materials of claim 1, wherein the laser unit further includes:
   a laser source for providing the laser beam; and
   an optical lens for providing the laser beam to pass through and to deflect the laser beam to the laminating surfaces of the two separate composite materials.

3. The laminating device for composite materials of claim 2, wherein the laser source is one of a carbon dioxide laser, a diode laser and a fiber laser.

4. The laminating device for composite materials of claim 2, wherein the laser beam has a wavelength of 300-1500 nm.

5. The laminating device for composite materials of claim 1, wherein each of the first hot roller and the second hot roller has a first temperature, each of the first cool roller and the second cool roller has a second temperature, and the second temperature is smaller than the first temperature.

6. The laminating device for composite materials of claim 5, wherein the hot roller assembly adopts one of an electric heating means and a hot-fluid heating means to heat up the first hot roller and the second hot roller to achieve the first temperature.

7. The laminating device for composite materials of claim 5, wherein the cool roller assembly adopts one of a fluid-cooling means and an air-cooling means to cool down the first cool roller and the second cool roller to achieve the second temperature.

8. The laminating device for composite materials of claim 1, wherein the axial roller-driving unit further includes:
   a first driving assembly, including:
      a first plate structure for loading the first hot roller and the first cool roller; and
      a second plate structure, connected to the spring force-adjusting unit, a sliding rack structure being located between the first plate structure and the second plate structure to enable the first plate structure and the second plate structure to perform a relative sliding motion in the first direction, the spring force-adjusting unit simultaneously providing a first spring force to the second plate structure, the first plate structure, the first hot roller and the first cool roller; and
   a second driving assembly, including:
      a third plate structure for loading the second hot roller and the second cool roller; and
      a fourth plate structure, connected to the spring force-adjusting unit, another sliding rack structure being located between the third plate structure and the fourth plate structure to enable the third plate structure and the fourth plate structure to perform another relative sliding motion in the first direction, the spring force-adjusting unit simultaneously providing a second spring force to the fourth plate structure, the third plate structure, the second hot roller and the second cool roller.

9. The laminating device for composite materials of claim 8, wherein the spring force-adjusting unit includes:
   a plurality of first spring assemblies, mounted at a first supportive plate and connected to the second plate structure, each of the first spring assemblies including:
      a first spring member for providing the first spring force to the second plate structure;
      a first constraint member, located between the first supportive plate and the first spring member; and
      a first adjusting node, mounted at the first supportive plate, for adjusting a distance between the first constraint member and the second plate structure so as to vary a spring force of the first spring member exerting on the second plate structure; and
   a plurality of second spring assemblies, mounted at a second supportive plate and connected to the fourth plate structure, each of the second spring assemblies including:
      a second spring member for providing a second spring force to the fourth plate structure;
      a second constraint member, located between the second supportive plate and the second spring member; and
      a second adjusting node, mounted at the second supportive plate, for adjusting a distance between the second constraint member and the fourth plate structure so as to vary a spring force of the second spring member exerting on the fourth plate structure.

10. The laminating device for composite materials of claim 1, wherein the first hot roller, the second hot roller, the first cool roller and the second cool roller are all axially aligned in the first direction.

11. The laminating device for composite materials of claim 1, wherein each of the two composite materials are one of a thermoplastic carbon-fiber composite material and a thermosetting carbon-fiber composite material.

* * * * *